Jan. 21, 1969  R. O. HEINE  3,422,547
EDUCATIONAL DEVICE
Filed March 25, 1966  Sheet _1_ of 2

INVENTOR.
RICHARD O. HEINE
BY
ATTORNEY

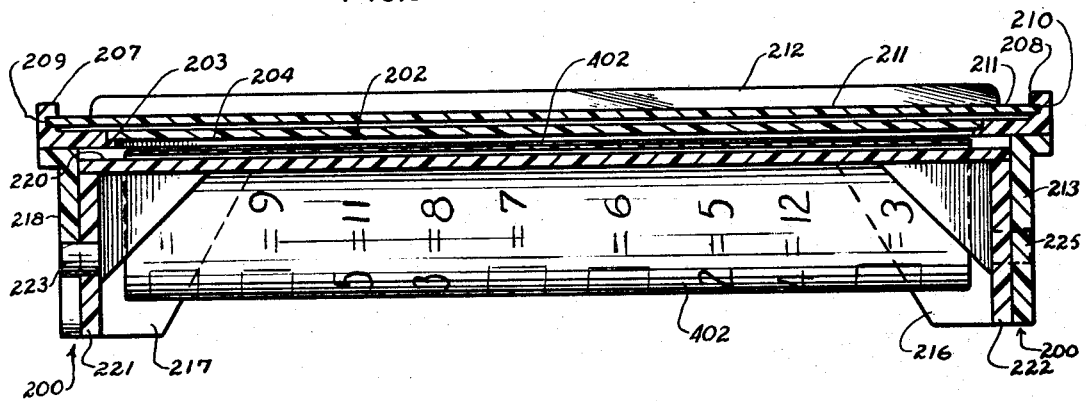
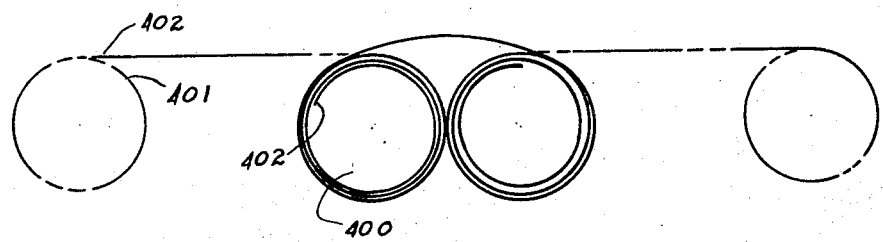
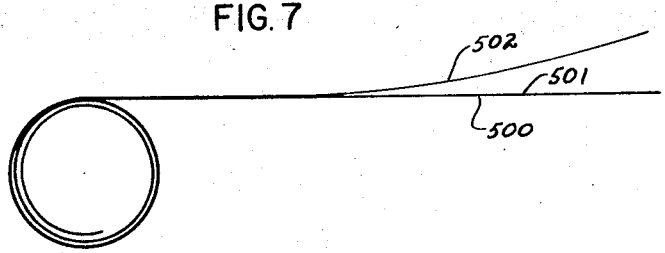

United States Patent Office 3,422,547
Patented Jan. 21, 1969

3,422,547
EDUCATIONAL DEVICE
Richard O. Heine, 30 Wall Ave., Valhalla, N.Y. 10595
Filed Mar. 25, 1966, Ser. No. 537,523
U.S. Cl. 35—9                                    2 Claims
Int. Cl. G09b 3/04, 1/02; G09f 11/24

ABSTRACT OF THE DISCLOSURE

A device for displaying information for teaching purposes comprising a structure characterized by its providing a slot to receive an elongated plastic coil spring which carries the information so that the spring can be held partially open to display information carried on the face of the plastic, the coils at that end of the device being adjustable to permit alteration of the position of the spring to display different sections thereof in the display of information.

---

Figure 1:
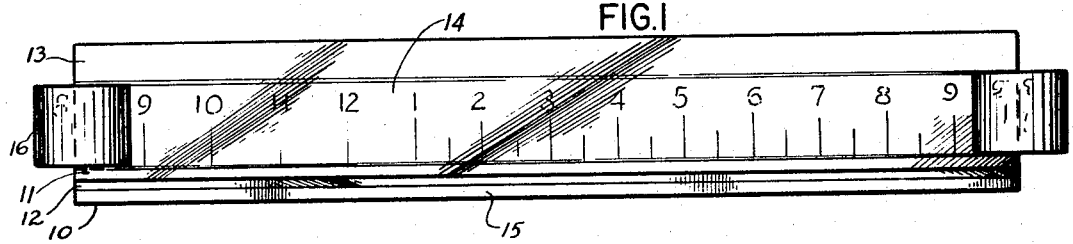

This invention relates to a device for the graphical presentation of communication material, the mechanism being one that provides for simultaneous display and identification with the possibility of varying, programming and progressing the display. The invention may further be characterized as being a teaching machine in which the mechanism is simple enough to be handled by an elementary school child for the display of information, entry of information and comparison of displayed, entered and recorded information.

Teaching machines, as they are sometimes identified, may have various degrees of sophistication in their construction. Generally, the machines useful for pupils should have complications in their construction and manipulation suitable for the age and experience level of the pupil handling it. At advanced student levels, the machines can be quite sophisticated. However, for the elementary school child who has yet to learn to read or manipulate numbers to any extent, the problem is to provide a mechanical device which will match his experience and not present an obstacle to learning.

It is, accordingly, a basic object of this invention to provide a display device suitable for use as a teaching machine wherein programmed information in display form may be progressively placed before the child with selected portions of it on display and corresponding selected portions covered so that appropriate drill work using programmed, displayed, and covered information can be worked out.

It is another object of this invention to provide an information display device based upon the utilization of a plastic spring which can coil around either of two horizontal axes during the display and storage of information being presented.

It is another object of the invention to provide a mechanism for utilization of information recorded on the plastic spring in a manner such that it can be displayed, inspected and used for instructional purposes in selected areas.

Other objects and advantages of the invention will in part be obvious and in part appear hereinafter as the details of the invention are set forth in the following specification and drawings.

Figure 2:
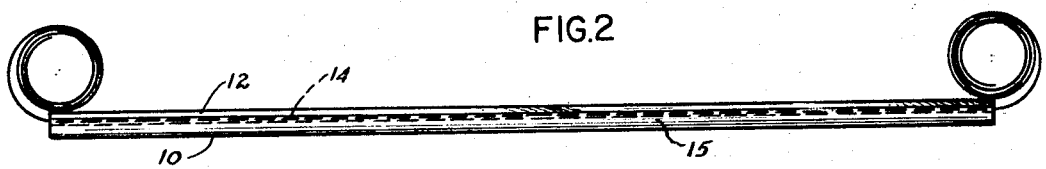
Figure 3:
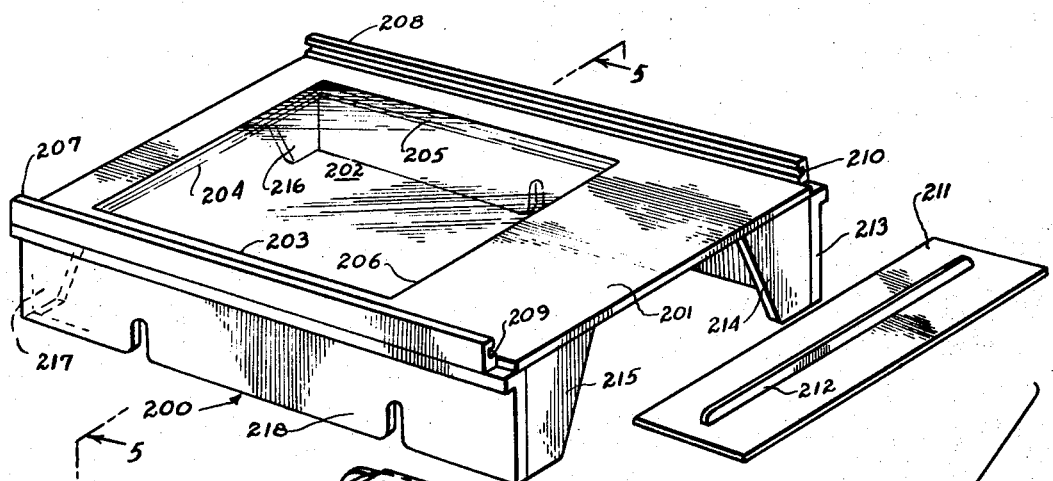
Figure 4:
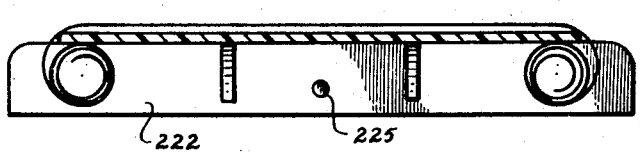

The invention, accordingly, comprises fundamentally a mechanism for displaying information on a plastic, flat spring, characterized by its ability to coil around parallel axes, the device consisting of a display-writing surface, having an opening therein of an area suitable for the display of the selected information, means associated with the display-writing surface on which the plastic spring is supported and, further, support means providing a spaced relationship between said plastic display-writing surface and, for example, a table wherein the parallel coils of the spring can be stored, the entire unit being of appropriate size to handle the display and, further, providing space so that the unit can be tilted and the spring rolls under the display surfaces manipulated to progress or return the displayed information to a particular desired area. The device may also be mounted for easier display and enlarged substantially for demonstration display to large groups of people. The invention, thus is embodied in the plastic spring information display unit and the device for selectively holding the unit in displayed position, and is characterized by the features of construction, combinations of elements and arrangements of parts set forth in detail hereinafter and as shown in the accompanying drawings, wherein:

FIGURE 1 represents a simple version of the information display device in the form of a plastic spring suitable for being coiled about its two parallel axes; and FIGURE 2 is a section thereof;

FIGURE 3 is a perspective exploded view of the preferred version of the information display device wherein the relationship of the display surface to the under supports is set forth; and FIGURE 4 is a sectional view of the display device as shown in FIGURE 3, taken along line 4—4; and FIGURE 5 is a section of the device taken along line 5—5 in FIGURE 3 showing its part in assembled relation; and FIGURE 6 illustrates a preferred form of plastic spring; and FIGURE 7 is a form of spring on which the information display is executed in a laminated form so as to permit it to withstand a plurality of uses in the machine.

Referring now to FIGURE 1 for the simplest embodiment of the invention, it will be seen to consist of a base 10 having a slot 11 therein, defined by ridges 12 and 13, with the top covered by a transparent sheet of plastic 14. The window thus formed is in a device which may take the form of a straightedge and actually have one or both long edges defined by a bevel 15. For display of information in the device, I utilize a plastic spring, the details of which will be described in connection with FIGURES 4 and 5.

The spring consists of a polyester resin film, preferably, for example, Mylar, of a thickness about .001 to .015 inch and tempered to form a spiral or roll which resists unrolling and normally will retain the designed rolled form.

Displayed on the spiral spring 16 which fits in the slot so that its face can be seen through the transparent top are indicia, which, preferably for this version of the device, are measures of length cued to the length of the unit itself. Thus, conventionally, I prefer to make the unit 10 one foot long, plus an inch or two to allow for definition of the display device at the ends.

In use, one foot of the length of the spring may be calibrated in inches; a second foot of the spring may be calibrated in one-half inch, and a third foot or section of the spring may be calibrated in one-fourth inch, and a fourth foot in one-eighth inch; a fifth in one-sixteenth inch etc.; to another foot in centimeters and another in millimeters.

The advantage of the display unit formed in this fashion is that the very definite teaching relationship of the utilitarian straightedge with the units of measure all related to each other and to the length of the straightedge are available in a single physical entity.

In the preferred version of the teaching device, as shown in exploded form in FIGURE 3, I take advantage of a wide plastic spring to form a display surface, again of a dual nature to provide a slot in which the spring can run, a mask related to the size of window and width of the column of information, and supporting mechanism for the display surface so that the entire unit need be no larger than an ordinary book lying in open position.

In more detail, therefore, the device consists of the unit 200 formed of a top surface 201 defining the principal display surface in which there is formed a display opening 202. The sides of the opening are defined by edges 203, 204, 205, 206.

Along the two long edges of the top are the upwardly extending projections 207, 208 in which are the slots 209 and 210 which respectively parallel the surface of the top. The slots are made to receive the mask 211, which consists of a rectangular, opaque sheet of plastic having a handle 212 attached thereto, thus making it possible to slide the mask into any desired position in the slots.

A support for the device consists of the sides, 213 and 218 which are attached to the top in any conventional manner such, for example, as by adhesive, and are held firmly in place by the end braces 214, 215, 216 and 217. The whole unit thus forms a supported surface which might be two or three inches up from the top of a table with the display opening in position for the study of information to be displayed. It will be noted that under the top is provided thus a substantial amount of space.

Within the space formed by the top and its sides and support, I provide the mechanism for information display which consists of a table top 220, side supports 221 and 222, and guides 223, 224 and 225. The guides need consist of no more than outwardly extending plastic projections or bearings matching slots in the side supports of the top. Two are provided on one face, one on the other, to avoid the possibility of inserting the piece in an incorrect position. The outer cover support is provided with slots for engaging the projections, the slots being further calculated in width to provide a slight friction fit in the running portion so as to lock the inner table gently in place.

The information display is developed by employing the wide, Mylar roll of the thickness indicated, namely, about 0.003 to 0.015 inch, the plastic sheet being tempered to form a reasonably tight self defining roll. Information is displayed on the roll in parallel columns, arranged axially, the columns being of the width of about half the window display area in the top piece. It will be observed that by making the inner support somewhat shorter than the outer, space is provided within the structure for the rolls formed by the ends of the Mylar film. The information on the roll may be advanced or retracted to suit the convenience of the user. Similarly, the information on the roll can be changed from reading information to number information, or whatever other coded or programmed exercise it is desired to include therein.

In FIGURE 6, I have illustrated the mechanism for the preparation and formation of the Mylar spring which I have found useful for purposes of this device. The plastic is generally available in sheet form of a variety of dimensions and while it has use as the sheet, I prefer to have it in the form of a spring.

To form a spring, reference can be had to FIGURE 6 wherein I have shown a central core 400 which may be of plastic. To this is applied a layer of adhesive 401 and thereto is attached the end of Mylar sheet 402. If the sheet is then carefully rolled around the core for the full length of the sheet to form essentially a spool, it will be observed that the entire unit then forms a neatly wound Mylar sheet. This may be held in the wound position and then tempered in an oven by baking it at a temperature of about 250 to 300° F. for a period of time sufficient to heat the plastic thoroughly. Upon cooling it will be found that the plastic develops a permanent set determined by the radius of the spool and it becomes quite useful for purposes of the machine.

It should also further be evident that rather large sheet can be processed to form the spools or springs and then cut in axial lengths to suit the needs of the user.

In FIGURE 7, I have illustrated a refined form of plastic spring suitable for displaying information. It should be obvious that in a simple mechanism of this kind, that the constant movement of the display information through the device will mar the surface, often to the point of making some of the display illegible. Of course, any alert teacher will detect this in time to make appropriate correction, but, in view of the fact that the primary function of the device and the primary function of the teacher is teaching, it is well to provide for protecting text display once it has been developed. Also, there is the advantage that by providing a protected surface, the child can be allowed to write on the protected surface, which writing can then be removed without disturbing the programmed material. Thus, referring to FIGURE 7, 500 identifies a base film of Mylar on the surface of which is applied programmed material 501. Over this there is then applied a second thin Mylar film which may be adhesively secured to the first. A light solvent application to the first or to the second film as it is guided into place and compressed will make a good firm adhesive bond, thereby forming a laminated structure where the outer wearing surface will be the clear Mylar. This has the advantage that in programmed learning material, for example, numbers work where arithmetical problems are established as shown, for example, in FIGURE 3. The student can write the answer in the space provided, inspect it, and check it against the correct answer which is provided in an adjacent column where it can be screened from view during the use of the exercise. Having established the correctness or incorrectness of his work, the student's writing can then be removed and the program be used in a subsequent exercise, for example, with a different pupil.

The device described in FIGURE 1 as described may be adapted for use as a multiple scale number line useful to the teacher of arithmetic. Each unit marked on a long tape is about one foot in length and carries a separate number line with its unique scale. When programming for the very elementary child, such scales as 0–10, 0–20, 0–30, etc. in units and fractional units; 0–2 in ⅛ units, etc.; together with −10 to +10 and −10 to −0 can be developed. The line is useful because many concepts involving numbers will refer to the number line. This makes available a useful device for presenting many number lines on a single long tape which facilitates relating them one to the other and to the child.

It is also quite apparent that the scale of the device can be made large so that the teacher can have a demonstration model and it also can be arranged to be mounted on an easel for demonstration.

In making the tapes in accordance with the description in accordance with FIGURE 6, I have found it possible to use tapes of ¼" width or 12" width or more with lengths to 75–100 feet. Generally, it is about 0.001 to 0.015 inch thick. Convenient lengths for handling are 10–12 feet.

The force or the pressure with which the plastic tape returns to the remembered position in the heat treated coil is related to the inside diameter of the coiled plastic. The inside diameter can be made from ¼" to 4". The tighter coils or small diameters develop stronger return or spring force factors. In regulating the force factors, the coiled tape, for preparation of heat treatment, can be placed inside a tube and heat treated in this position to give a specifically defined size.

In making the plastic spring, preferably as indicated herein of Mylar, polyester resin which has found a variety of applications in sheet form rather than using a core of plastic or wood, it is possible to make the spring at one end carrying a self-defined core and the other with a straight uncurled plastic. For example, referring to FIGURE 6, a coil is made by applying any adhesive (e.g., solvent) suitable for use with the plastic film to the sheet over a distance 10X and coiling the plastic itself to form an inside diameter of about X. Thus, a core is formed of a sheet thickness made of about 3 layers of the plastic (circumference=3½X) and the coil is completed to the point of leaving an end of the plastic uncoiled of the length of straight lead desired. The coil is heat treated and a spring is formed with its own core. The advantage of the straight lead is that it is left free of the coiled material, stays free and can be easily grasped to start the tape through the machine.

It will be seen from the foregoing description that the plastic spring tapes make available a versatile device by means of having a combination of unique features not otherwise available.

For example, the laminated structure illustrated in FIGURE 7 gives a programmed display of the teaching material which has a long life equal to the wearing quality of the film. The polyester film, the best example being Mylar which is the specific preferred form, has unusual qualities which make it useful for the handling by children or adults. It has high tear, tensile and impact strength, is resistant to water and water vapor and to oils, grease, gases and solvents. Hence, it is evident that in the handling of a device of this kind, it approaches indestructability.

The coil or spring action of the tape, combined with the programmed material and the physical display, wherein a selected portion of the display can be concealed, i.e., the correct answer column, reduces the teaching device to a mechanism easily handled and, hence, suitable for use by very young children.

A great deal of material relating to a given topic can be stored on the spring in developing the programmed learning, also, the surface can be written on using pencil or grease pencil and then easily erased and reused.

It will be apparent from this description that the invention, which comprises the utilization of the plastic film in a dual display unit, having a supporting base and an outer guiding face with a window and mask takes full advantage of the property of the Mylar to form a spring, thereby making possible the organization of programmed material for learning purposes and the development of display in organized fashion for the said material.

Materials of construction for use in the fabrication of the device can be as variable as the imagination of the designer. Sheet metal is suitable and lends itself very well to the purpose because the device can be projected into a single flat cut, or several more, which is thereafter subject to being bent into the appropriate shape for forming the device. Wood is also suitable, but as is very obvious, fabrication of wood generates certain costs which may render the device prohibitively expensive.

My preferred material of construction is plastic. It has the advantage that it is available in a variety of sheet forms and, further, that the basic contours of this device, namely, the upper section and the lower inner support, are adaptable to design which can be extruded or injection molded. Should it be desirable to fabricate the material from prepared sheet plastic, this can also be done.

My preference is for plastic because it is also available in a wide variety of very colorful materials, which can be put together to form an attractive unit suitable for handling. Suitable plastic materials are styrene sheet, urea formaldehyde sheet, polyester Lucite sheet, and combinations thereof.

While the invention has been described in terms of the specific embodiments herein, it should be apparent that variations thereof may be developed without departing from the spirit or scope of the invention.

What is claimed is:

1. A straightedge comprising an elongated member formed to have at least one long edge useful as a straightedge, a slot in said member running the length of said member, a transparent cover over the said slot and a plastic resin spring formed as a coiled elongated sheet extending through the said slot, the said plastic resin spring having instructional information thereon and being coiled so that any portion of the surface thereof free of the slot, coils about an axis perpendicular to the long dimension of the straightedge.

2. A teaching information display device comprising a box having a top and at least two parallel sides, said sides having a depth about one-fifth of the width of the top, an opening defined in said box top, the opposite face of said box being entirely open, notches in the sides of said box to guide a second frame, said second frame fitting within said open box, having sides co-terminous with said top sides, said second frame forming a base continuous under said top to define a slot therebetween, said second frame being shorter than said top box, a long sheet of plastic resinous material tempered to form a coil of plastic spring, said coil of plastic spring being held in the slot formed between said outer and said inner boxes so as to form a display surface visible through the opening in said top box, and a mask movable in said outer box to obscure part of said display, said coil having an elasticity factor such that it is relatively tightly wound at each end of said inner box, said coil thus being held within said frame for display of information.

References Cited

UNITED STATES PATENTS

| | | | |
|---|---|---|---|
| 2,547,259 | 4/1951 | Engelhardt | 35—73 XR |
| 3,016,638 | 1/1962 | Singer | 40—86 XR |
| 3,159,937 | 12/1964 | Barnes | 40—86 XR |
| 3,195,242 | 7/1965 | Ward et al. | 40—86 XR |

WILLIAM H. GRIEB, Primary Examiner.

U.S. Cl. X.R.

33—107; 35—31; 40—86